(12) United States Patent
Chiu et al.

(10) Patent No.: US 11,777,996 B2
(45) Date of Patent: Oct. 3, 2023

(54) DISTRIBUTED ONE-TIME-USE ENTRY CODE GENERATION FOR PHYSICAL ACCESS CONTROL METHOD OF OPERATION AND MOBILE SYSTEMS

(71) Applicants: Hsin-Cheng Chiu, Bethesda, MD (US); Steven Mark Bryant, Sterling, VA (US)

(72) Inventors: Hsin-Cheng Chiu, Bethesda, MD (US); Steven Mark Bryant, Sterling, VA (US)

(73) Assignee: Brivo Systems LLC, Bethesda, MD (US)

( * ) Notice: Subject to any disclaimer, the term of this patent is extended or adjusted under 35 U.S.C. 154(b) by 1099 days.

(21) Appl. No.: 16/458,044

(22) Filed: Jun. 29, 2019

(65) Prior Publication Data
US 2019/0325673 A1 Oct. 24, 2019

Related U.S. Application Data

(63) Continuation-in-part of application No. 15/390,507, filed on Dec. 25, 2016, now abandoned.

(51) Int. Cl.
| | |
|---|---|
| *H04L 9/40* | (2022.01) |
| *G07C 9/00* | (2020.01) |
| *H04W 12/08* | (2021.01) |
| *G06F 16/23* | (2019.01) |
| *G06F 16/908* | (2019.01) |
| *G07C 9/23* | (2020.01) |

(Continued)

(52) U.S. Cl.
CPC ........ *H04L 63/205* (2013.01); *G06F 16/2365* (2019.01); *G06F 16/908* (2019.01); *G07C 9/00* (2013.01); *G07C 9/21* (2020.01); *G07C 9/215* (2020.01); *G07C 9/23* (2020.01); *H04L 63/08* (2013.01); *H04L 63/10* (2013.01); *H04W 12/08* (2013.01); *H04L 63/0823* (2013.01); *H04L 63/0838* (2013.01); *H04L 2463/121* (2013.01); *H04W 12/06* (2013.01); *H04W 12/61* (2021.01)

(58) Field of Classification Search
CPC ............. H04L 29/06795; H04L 63/205; G06F 16/2365
USPC .......................................................... 726/1
See application file for complete search history.

(56) References Cited

U.S. PATENT DOCUMENTS

| | | | |
|---|---|---|---|
| 8,646,060 B1* | 2/2014 | Ben Ayed | H04W 4/20 726/9 |
| 2009/0173782 A1* | 7/2009 | Muscato | G06Q 20/40975 235/379 |

(Continued)

*Primary Examiner* — Teshome Hailu
(74) *Attorney, Agent, or Firm* — PATENTRY; Peter G H. Hwang (57) ABSTRACT

A physical access control system enables acceptable portal entry codes upon receiving each physical access request by operating on the elapsed time from a previous physical access request to generate a temporal credential. The controller receives a plurality of physical access requests from a plurality of mobile application devices. Upon authenticating the first access request, the controller eliminates repetition from the space of acceptable successor requests from each mobile application device. Monotonic nonces advance the range of temporal code matches. Entry code generation is decentralized to distributed application devices and is inherently unknowable until a successor access request is initiated by the same application device.

2 Claims, 10 Drawing Sheets

(51) Int. Cl.
*G07C 9/20* (2020.01)
*G07C 9/21* (2020.01)
*H04W 12/06* (2021.01)
*H04W 12/61* (2021.01)

(56) References Cited

U.S. PATENT DOCUMENTS

| | | | | |
|---|---|---|---|---|
| 2009/0205036 A1* | 8/2009 | Slaton | ................. | H04L 63/0815 |
| | | | | 726/26 |
| 2010/0067698 A1* | 3/2010 | Hahn | ................... | H04L 63/123 |
| | | | | 380/270 |
| 2012/0066748 A1* | 3/2012 | Vimpari | ................ | H04L 63/105 |
| | | | | 726/6 |
| 2015/0086017 A1* | 3/2015 | Taylor | .................. | H04L 9/3226 |
| | | | | 380/270 |

* cited by examiner

┌─────────────────────────────────────────────────────────────────┐
│  AT A MOBILE APPLICATION DEVICE, RECEIVING CREDENTIAL, PROTOCOL │
│   VERSION, HASHING FORMAT, AND TIME WINDOW FOR USER REQUESTS    │
│                 (BLEINTERVAL RANGE) FROM SERVER                 │
│                              710                                │
└─────────────────────────────────────────────────────────────────┘
                                  │
                                  ▼
┌─────────────────────────────────────────────────────────────────┐
│   TRANSMITTING DATETIME FROM MOBILE APPLICATION DEVICE TO       │
│  SERVER TO DETERMINE WHEN DRIFT FROM SERVER DATETIME EXCEEDS    │
│                    MAXDIVERGENCE THRESHOLD                      │
│                              780                                │
└─────────────────────────────────────────────────────────────────┘
                                  │
                                  ▼
┌─────────────────────────────────────────────────────────────────┐
│   UPDATING DATETIME AT THE MOBILE APPLICATION DEVICE UPON       │
│     RECEIVING A RESYNCH NOTIFICATION THAT DRIFT EXCEEDS         │
│                    MAXDIVERGENCE THRESHOLD                      │
│                              790                                │
└─────────────────────────────────────────────────────────────────┘
```

DISTRIBUTED ONE-TIME-USE ENTRY CODE GENERATION FOR PHYSICAL ACCESS CONTROL METHOD OF OPERATION AND MOBILE SYSTEMS

CROSS-REFERENCE TO RELATED APPLICATIONS

This application is a continuation in part of currently pending non-provisional application Ser. No. 15/390,507 filed Dec. 25, 2016 and benefits from its priority date.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to physical access control systems such as electronic readers, door strikes, and similar apparatus, along with mobile application devices such as smart phones and wearable electronics.

Description of the Related Art

Cipher locks, card keys, and mobile devices are used to credentialize authorized users at electronically controlled doors. Generally, these must be presented to a reader or sensor next to the door. Once delivered wirelessly, they are vulnerable to copying and reuse.

As is known, non-repeating key pairs are compute intensive and require the infrastructure of private and public keys which do not scale well.

What is needed is a low overhead security system that does not depend on distribution of a shared secret which may be intercepted or duplicated.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A physical access control system predicts acceptable portal entry codes upon receiving each physical access request. The controller receives a plurality of physical access requests from a plurality of mobile application devices. Upon authenticating the first access request, the controller eliminates repetition from the space of acceptable successor requests from each mobile application device. Monotonic nonces advance the range of temporal code matches. Entry code generation is decentralized to distributed application devices.

A physical access control system requires each request to be unpredictable until it has been received and refuses repetition of any access request packet. A physical access control system also checks a sequence of access requests and determines when indicia are unusually presented out of order or reiterated. Alternately, a portal controller apparatus receives a plurality of physical access requests that includes at a minimum the users' access credential (access requests) from a plurality of mobile application devices. Because mobility is desired with the least amount of friction, a wireless coupling is utilized. Bluetooth, RFID, Wi-Fi, infrared, optical, and cellular communication channels are exemplary but non-limiting embodiments of wireless links. The controller determines for each mobile application device (app device) a sequence of access requests which apply to a temporal credential.

An unpredictable temporal credential is synthesized by a mobile application device from the elapsed time between at least one of its predecessor access requests and its current successor access request.

Upon receiving a successor, the controller performs an authentication process by determining the elapsed time between the successor just received and at least one of the predecessor access request received from the same mobile application device. Only after the successor request is received can a temporal credential be verified.

On the condition the authentication process passes, a newer predecessor datetime is written into non-transitory storage to be used to yet verify another subsequent successor.

The wireless apparatus controls physical access through a portal by forward verification of one-time-use codes submitted by a mobile application device. The system enables a single physical access control code upon each successful physical access request.

The apparatus sets a flag that triggers an action when a one-time-use code is received out of sequence. The controller receives a plurality of physical access requests from a plurality of mobile application devices.

The controller determines for each mobile application device a sequence of access requests.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In an embodiment of the invention, the content of each access request packet is unique and unpredictable by transforming a timestamp and a nonce at the point of entry. A plurality of acceptable transformations is compared upon reception of the access request.

In another embodiment of the invention, a timestamp included in a first physical access request (predecessor) is used to verify a subsequent second physical access request. The timestamp may be transformed e.g. by masking to describe a range of time. To be accepted, the subsequent second physical access request (successor) must include the transformed timestamp of the predecessor. On the condition the authentication process fails, the controller sets a flag of questionable chain of control associated with the app device.

In an embodiment, each one-time verification code is synthesized by the app device and transmitted in at least one of a predecessor and successor request.

In an embodiment, each one-time verification code is a transformation of a timestamp read from the system clock of the app device.

In an embodiment, each newer one-time verification code is synthesized as transformation of the predecessor and transmitted only in the successor.

In an embodiment, each newer one-time verification code is a transformation of the result of authentication of the predecessor request.

In an embodiment, a flag of questionable chain of control causes an access control policy to be performed at the portal actuator.

In an embodiment, a range of time related to the last successful physical access request is transformed into a forward verification code. In an embodiment, the difference in time between a request and the last successful physical access request by that sender is transformed into a forward verification code. In an embodiment, a mask of least significant bits provides a range of time relating a request and the last successful physical access request by that sender is transformed into a forward verification code.

In an embodiment, a masked timestamp of the physical access control request is transformed into a verification code.

The physical access controller apparatus enables a portal actuator upon verification of said successor access request only on the condition that a verification code in the successor is accepted. In an embodiment, the verification code is provided in the payload of the predecessor. In an embodiment, the verification code is derived from a seed provided in the payload of the predecessor. In an embodiment, the verification code is a transformation of the metadata associated with the successful submission of the predecessor. The transformation process may include hashing. The transformation process may include hashing a masked string of metadata to allow a range. The transformation process may include hashing a masked timestamp of the acknowledgement of the predecessor access request.

In an embodiment, the delta time between the predecessor and successor timestamps is a seed for a verification code.

A visualization of the history of verification codes would be a chain of single links. If a link is received that attaches onto other than the latest link, the system denies access and resets the verification process.

One embodiment of the invention may be understood as a flowchart although several processes may be concurrent or executed in an alternate order. By bringing the phone into the proximity of a door, it receives a broadcast reader identifier by electronic means such as but not limited to BT/BLE beacon protocol. The access request application is initiated by the user or in an embodiment by the reception of the beacon with sufficient electro-magnetic signal power.

The application determines a date time rounded to the nearest date time window. In an embodiment, this window of time is defined herein as bleInterval. In an embodiment, bleInterval is determined by masking at least one range of bits of a device's DateTime.

The application transforms a bleInterval in combination with the door identifier, user_id, credential into a temporal credential using a hash. In an embodiment, the hash is referred to within this application as vhash and applies a well known standard such as SHAKE128.

An access request packet is assembled by concatenating user and door identifiers and protocol information to the temporal credential.

In an embodiment, a nonce generator inserts a value into the access request packet to avoid duplicate access requests. (The nonce remediates for ambiguities in datetime windows.)

The application transmits the resulting access request packet to the panel.

In embodiments of the invention, the access request application may be initiated by the processor upon any of the following exemplary triggers: receiving reader_id contained in a beacon packet, a direct intent mechanism, using a second application, connecting to a third application via application extension, and passing intents to background services.

Figure 1:
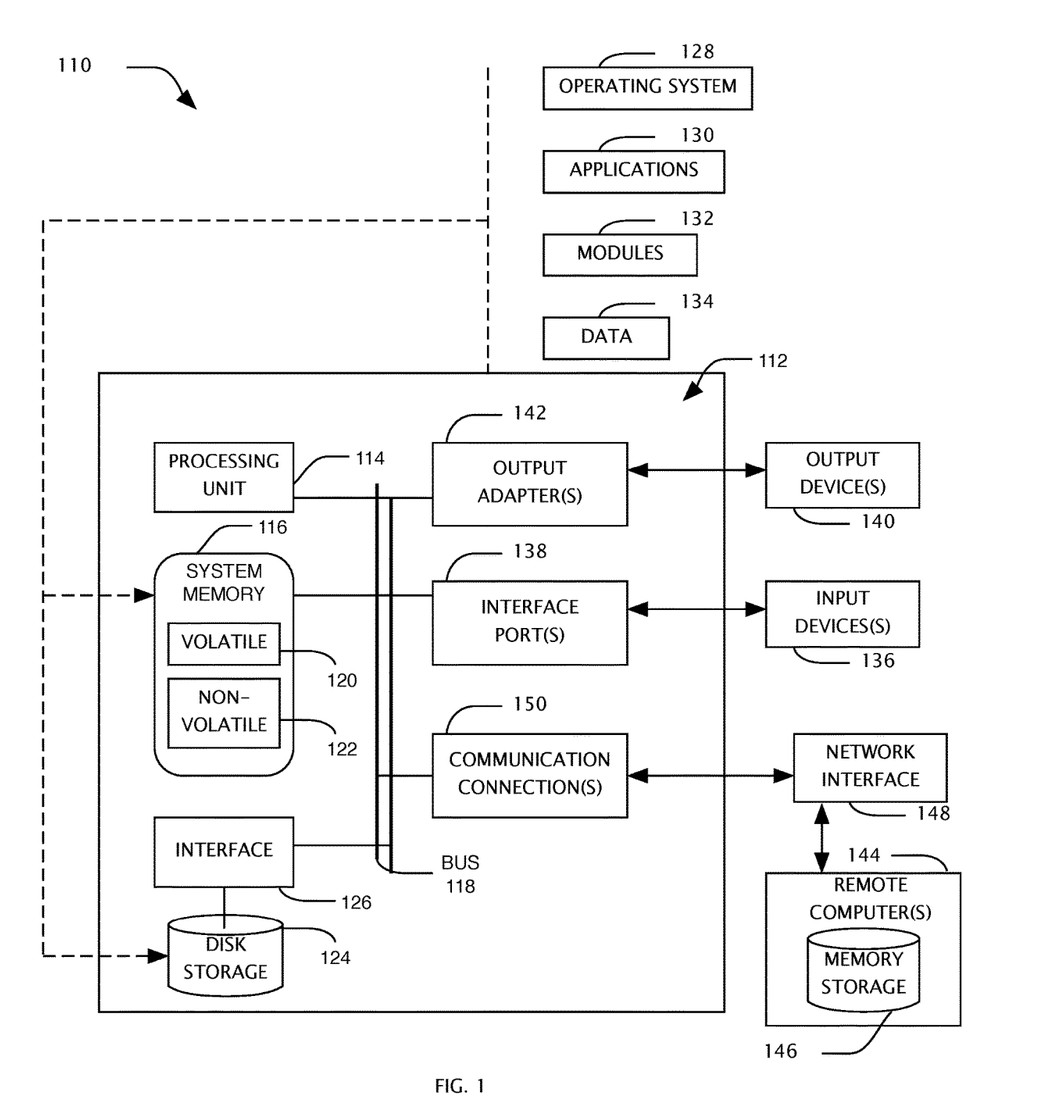
FIG. 1 illustrates an exemplary environment informally referred to as a processor, computer, application device, or server for implementing various aspects of the invention.

Referring now to the figures, FIG. 1 illustrates an exemplary environment 110 informally referred to as a processor, computer, application device, or server for implementing various aspects of the invention.

Figure 2:
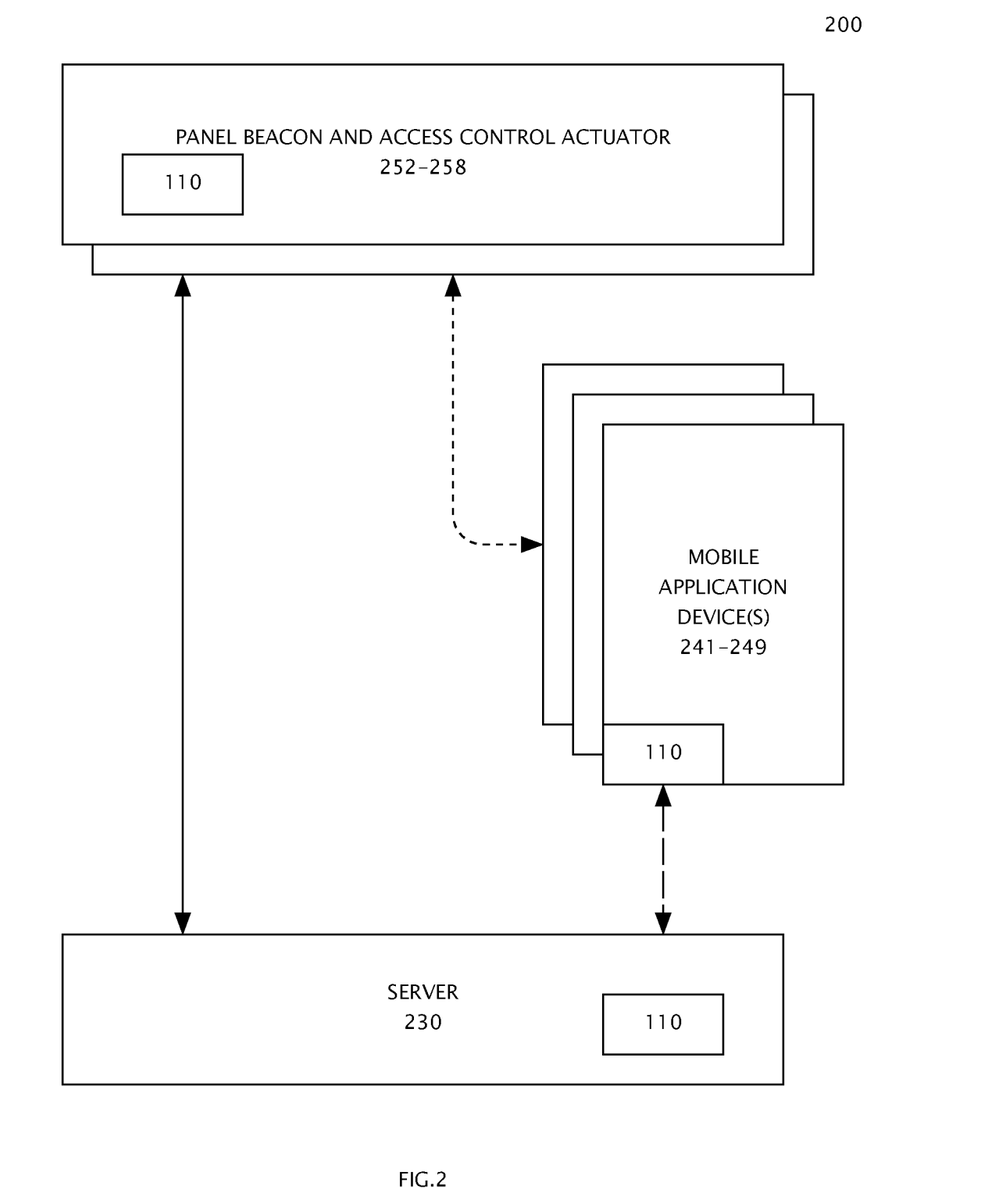
FIG. 2 is a block diagram of a system for physical access control of portals such as doors by a server in communication with mobile application devices such as phones which include the components illustrated in FIG. 1.

FIG. 2 is a block diagram of a system 200 for physical access control of portals such as doors by a server in communication with mobile application devices such as phones which include the components 110 illustrated in FIG. 1. A server at 230 provides credentials which may be distributed to communicatively coupled mobile application devices 241-249 and to panel beacon and access control actuators 252-258. Applications on the mobile application devices 241-249 may be triggered when encountering beacon signals emitted by the panels 252-258 or initiated by mechanisms within an application, service, or user interface of the mobile application device itself. The access request application uses its datetime, the identity of the user, the identity of the door and other credentials to generate an access request packet to be transmitted to the server 230 or to the portal apparatus. This includes generation of a temporal credential which is checked by the panel or by the server. A server will determine rejection or acceptance of the request and, in the event of the latter, transmit the disposition to the panel controlling the actuator.

Figure 3:
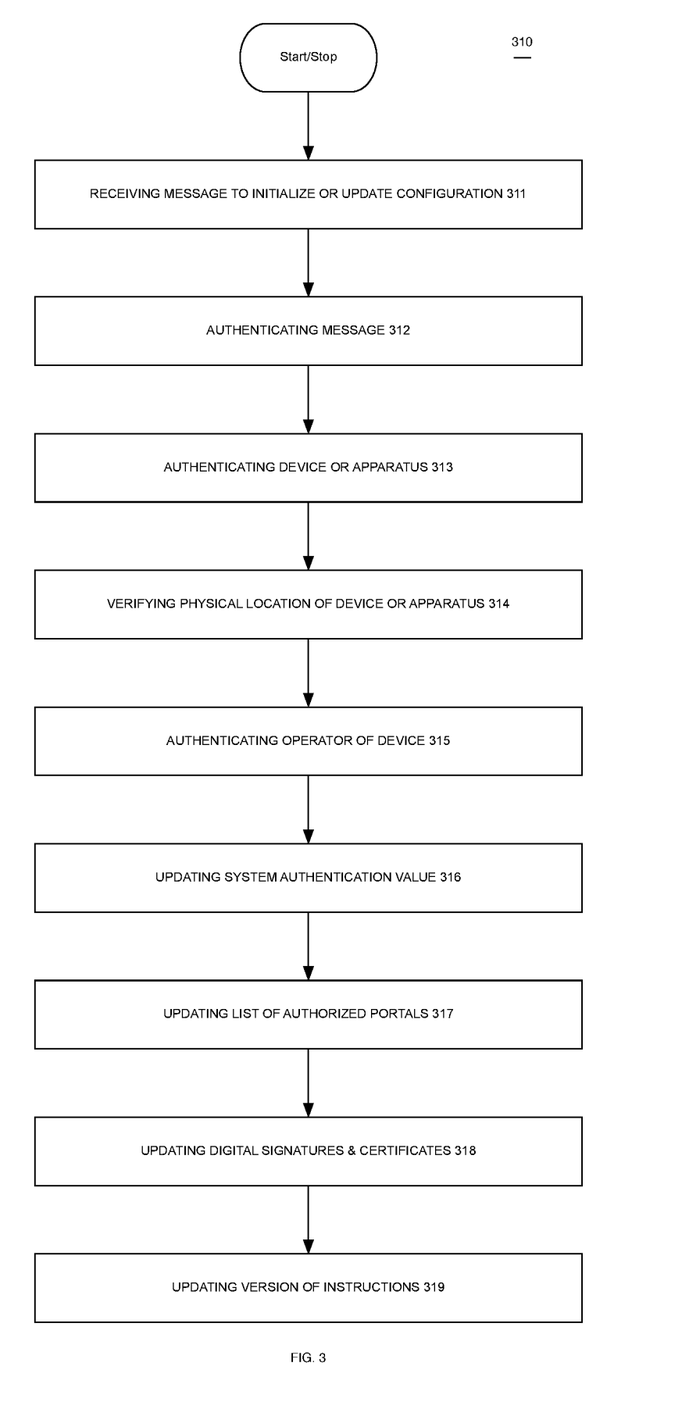
FIG. 3 is a flow chart illustrating an exemplary methodology of the subject invention performing steps in a server of the system.

FIG. 3 is a flow chart illustrating an exemplary methodology of the subject invention performing method steps 310 in a server 230 of the system. The process starts by receiving message to initialize or update configuration 311; authenticating a message 312; authenticating a device or apparatus 313; verifying physical location of device or apparatus 314; authenticating operator of device 315; updating system authentication value 316; updating list of authorized portals 317; updating digital signatures and certificates 318; and, updating version of instructions 319.

Figure 4:
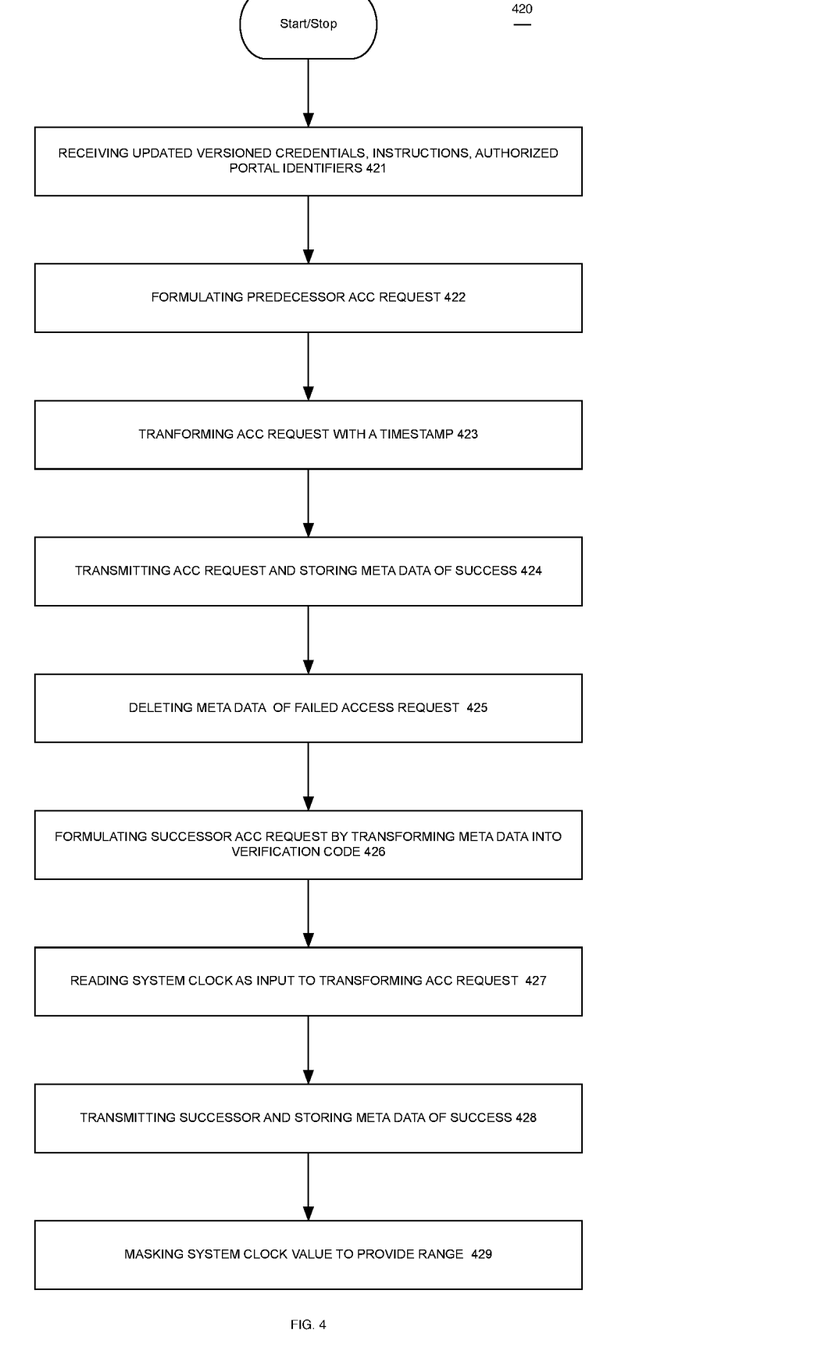
FIG. 4 is a flow chart illustrating an exemplary methodology of the subject invention performing steps in a mobile application device, e.g. phone, of the system.

FIG. 4 is a flow chart illustrating an exemplary method 420 of the subject invention performing steps in a mobile application device, e.g. phone, of the system: receiving updated versioned credentials, instructions, authorized portal identifiers 421; formulating predecessor ACC request 422; transforming ACC request with a timestamp 423; transmitting ACC request and storing metadata of success 424; deleting meta data of failed access request 425; formulating successor ACC request by transforming metadata into verification code 426; reading system clock as input to transforming ACC request 427; transmitting successor and storing metadata of success 428; and masking system clock value to provide range 429.

Figure 5:
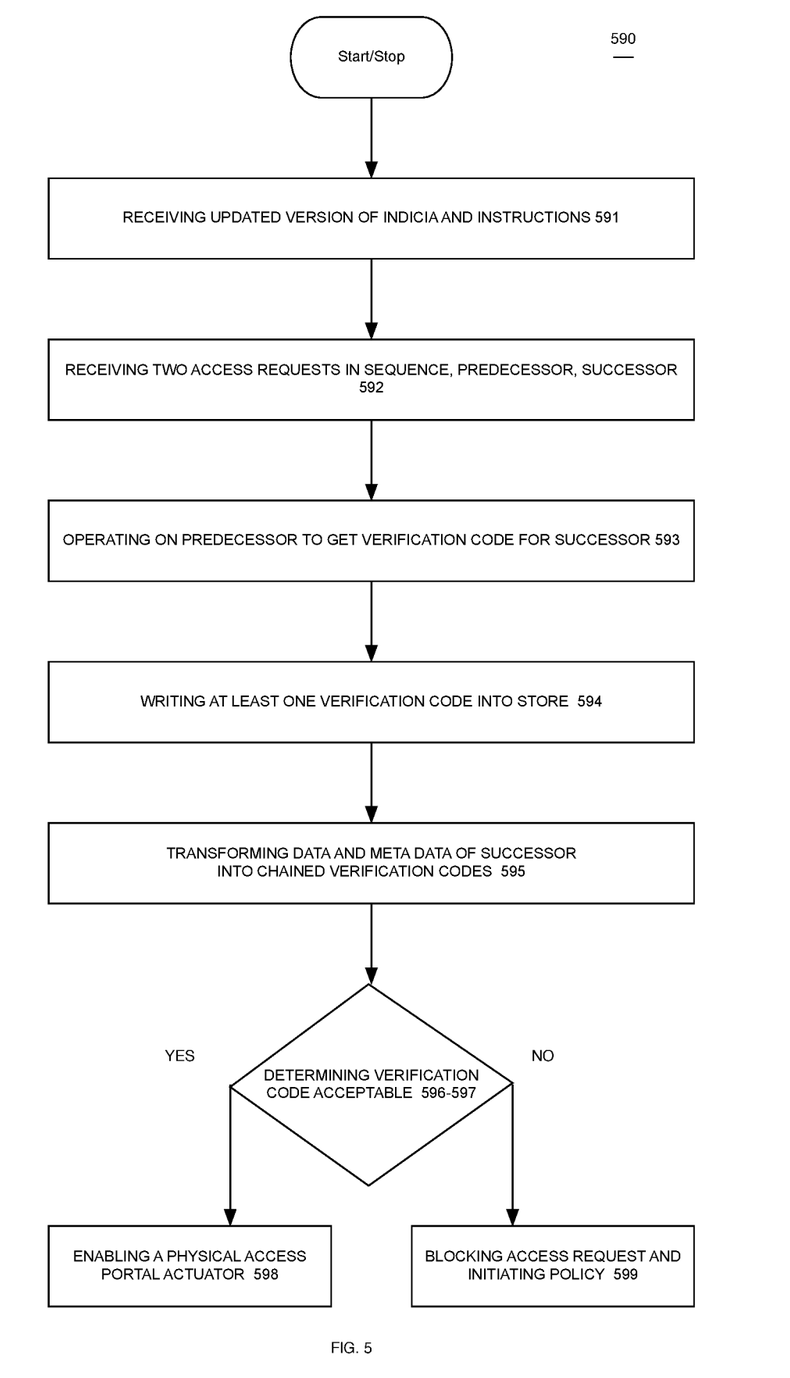
FIG. 5 is a flow chart illustrating an exemplary methodology of the subject invention performing steps in a portal beacon and access control actuator, e.g. door, of the system.

FIG. 5 is a flow chart illustrating an exemplary method 590 of the subject invention performing steps in a portal beacon and access control actuator, e.g. door, of the system: receiving updated version of indicia and instructions 591; receiving two access requests in sequence, predecessor and successor 592; operating on predecessor to get verification code for successor 593; writing at least one verification code into store 594; transforming data and meta-data of successor into chained verification codes 595; determining if verification code acceptable 596-597; if acceptable, enabling a physical access portal actuator 598 and if not acceptable blocking access request and initiating policy 599.

Figure 6:
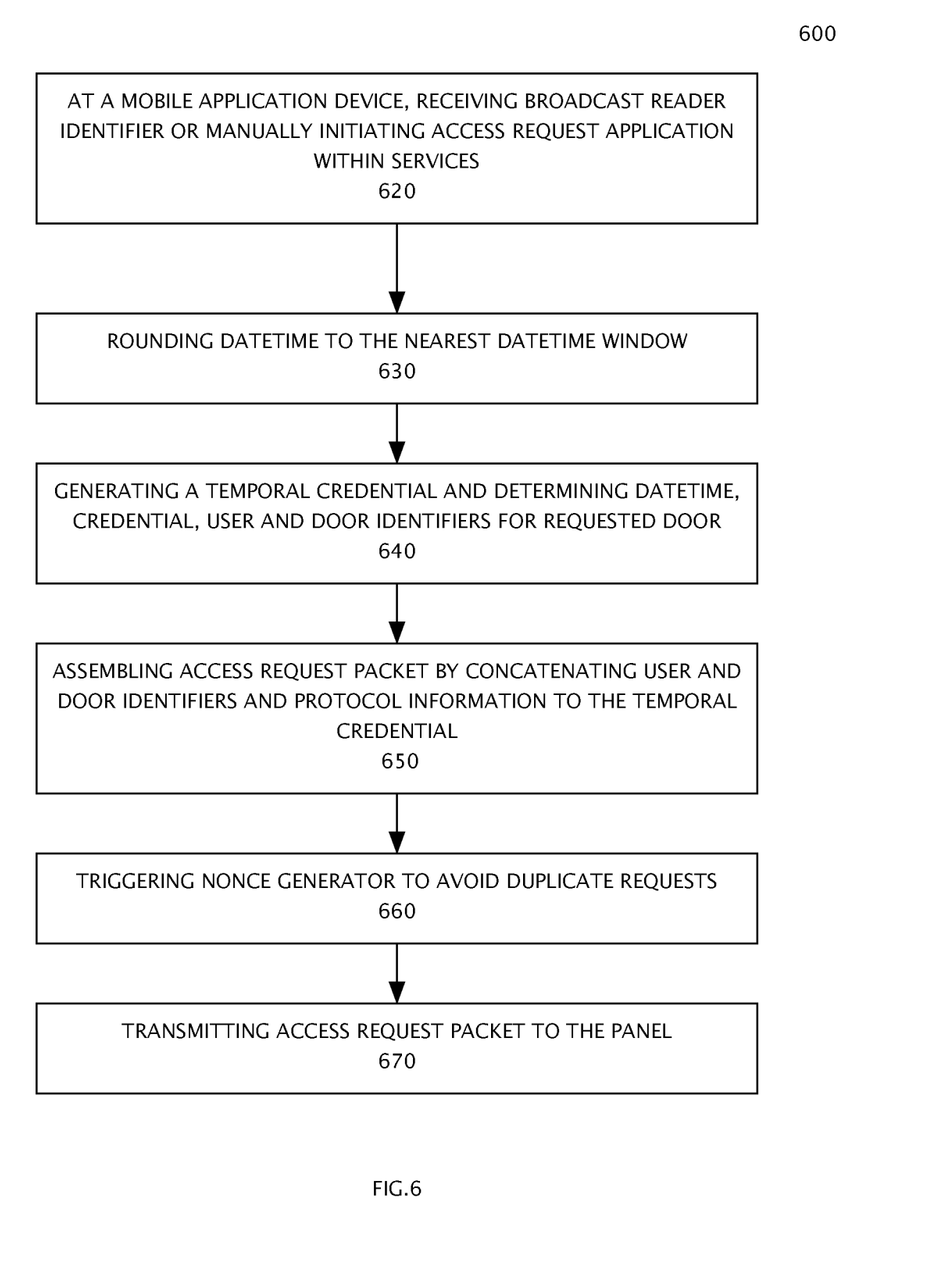
FIG. 6 is flowchart of a method at a mobile application device for requesting access.

FIG. 6 is flowchart of a method 600 at a mobile application device for requesting access: receiving broadcast reader identifier or manually initiating access request application within services 620; rounding datetime to the nearest datetime window 630; generating a temporal credential and determining datetime, credential, user and door identifiers for requested door 640; assembling access request packet by concatenating user and door identifiers and protocol information to the temporal credential 650; triggering nonce generator to avoid duplicate requests 660; and transmitting access request packet to the panel 670.

Figure 7:
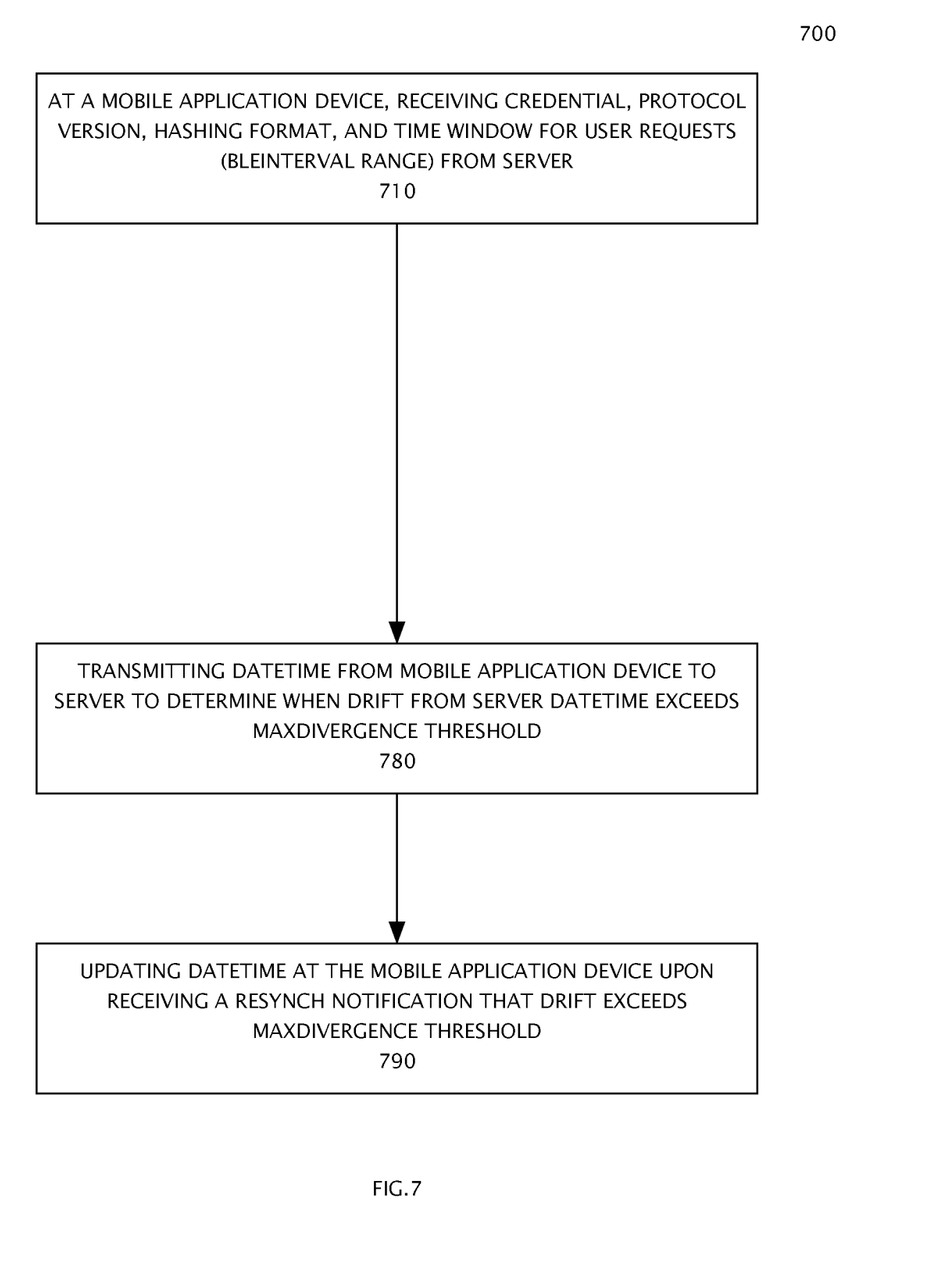
FIG. 7 is a flowchart of a method for the infrastructure necessary to ensure coherence of datetime between the server and the mobile application device.

FIG. 7 is a flowchart of a method 700 for the infrastructure necessary to ensure coherence of datetime between the server and the mobile application device: at a mobile application device, receiving credential, protocol version, hashing format, and time window for user requests (BLE interval range) from server 710; transmitting datetime from mobile application device to server to determine when drift from server datetime exceeds Maxdivergence threshold 780; and, updating datetime at the mobile application device upon receiving a re-sync notification that drift exceeds Maxdivergence threshold 790.

Figure 8:
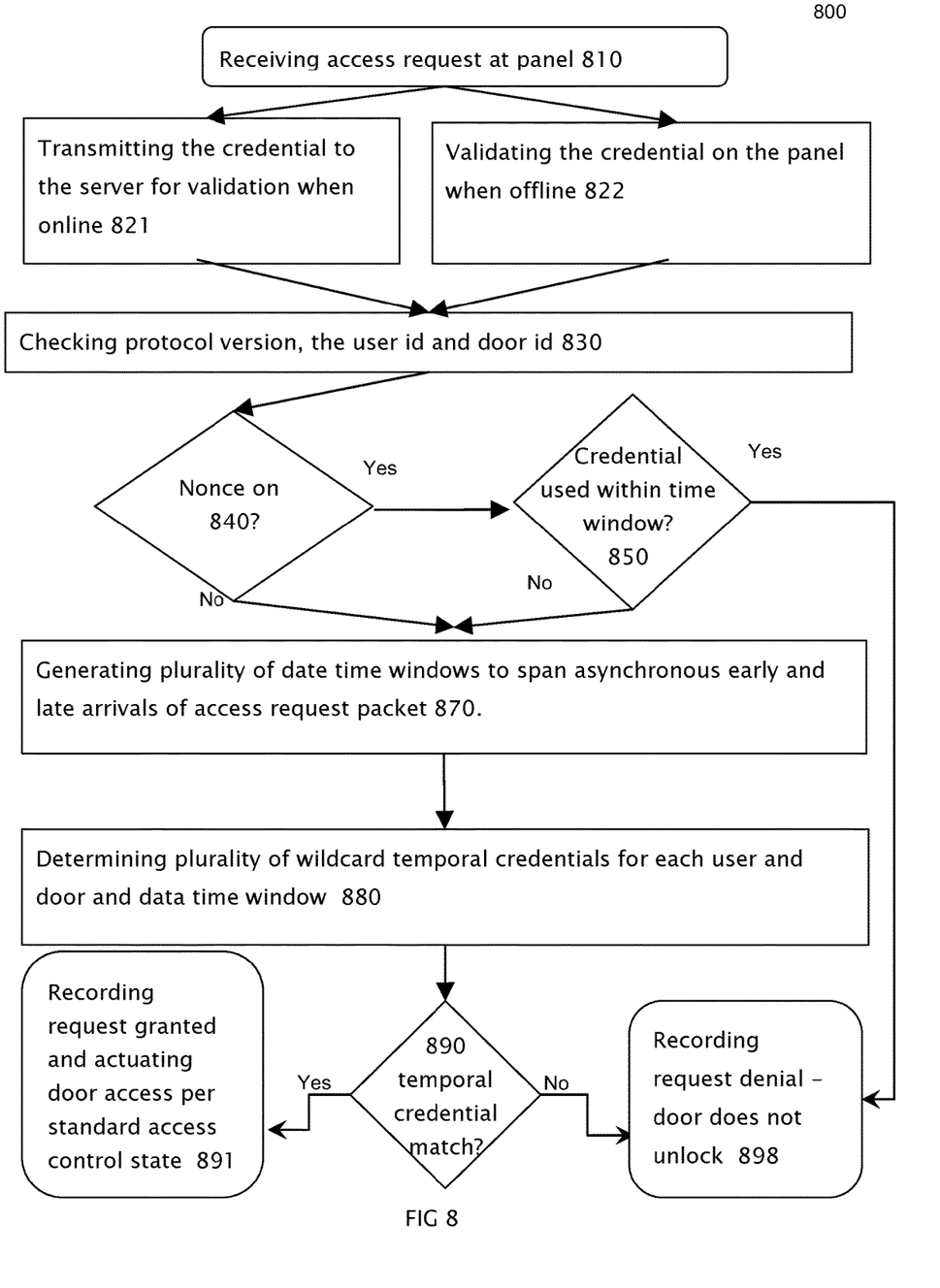
FIG. 8 is a flowchart of an exemplary non-limiting embodiment for method of operation of the system across various components.

FIG. 8 is a flowchart of an exemplary non-limiting embodiment for method of operation of the system across various components: receiving access request at panel 810; when server online transmitting the credential to the server for validation 821; when server off-line validating the credential on the panel itself 822; checking protocol version, the user ID, and door ID 830; if correct checking if nonce is on 840; if nonce on is true checking credential used within time window 850; when nonce on is no or when credential is not used within time window, generating plurality of daytime windows to spend asynchronous early and late arrivals of access request packet 870; determining plurality of wild card Temporel credentials for each user and door and date time window 880; determining if temporal credentials match 890, if yes, recording request granted and actuating door access per standard access control state 891; and else recording request denial—door does not unlock 898.

Figure 9:
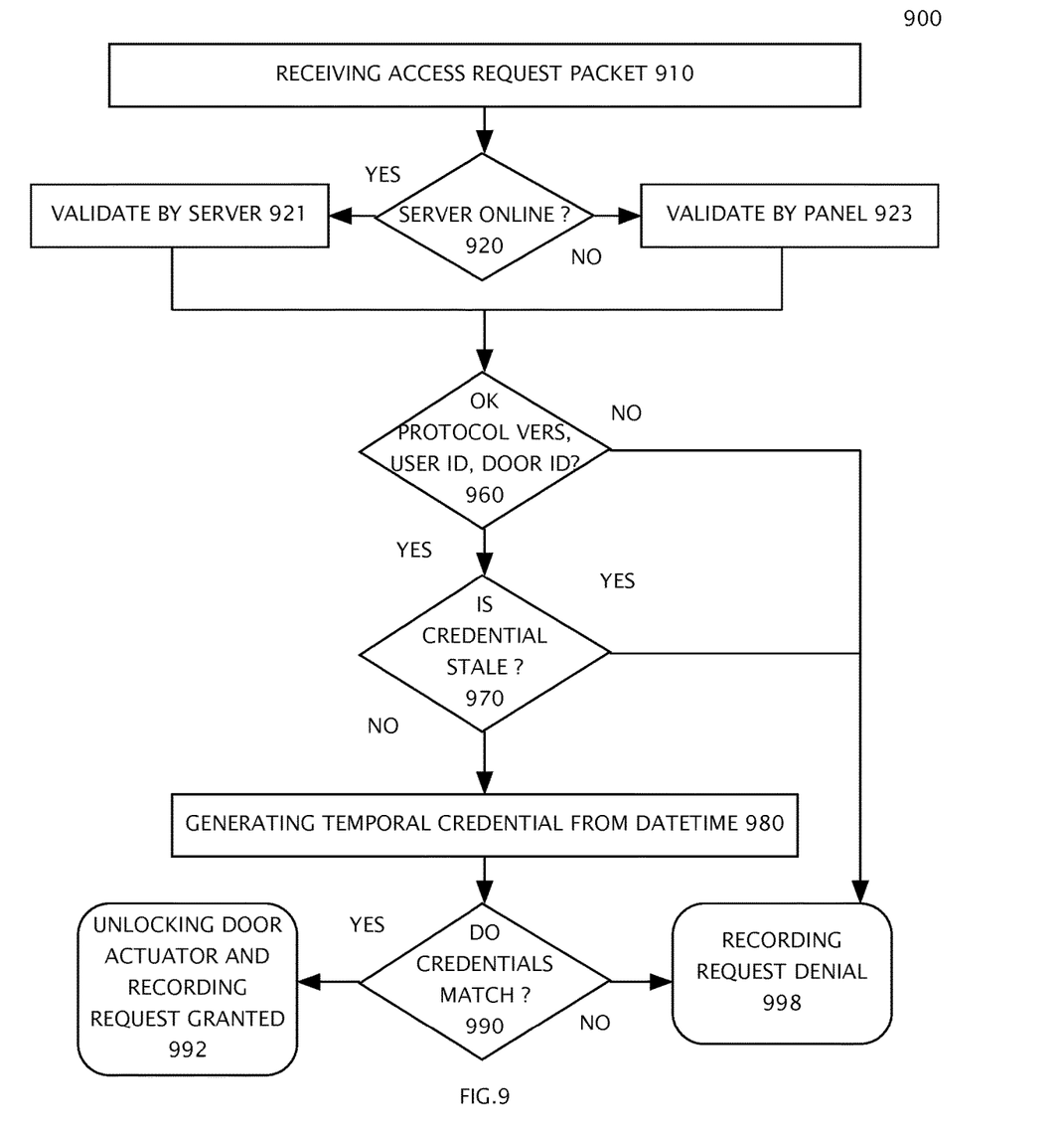
FIG. 9 is a flowchart of an exemplary non-limiting method embodiment of processing an access request packet to enable or deny actuation of a portal.

FIG. 9 is a flowchart of an exemplary non-limiting method 900 embodiment of processing an access request packet to enable or deny actuation of a portal: receiving access request packet 910; determining server on line 920; if yes, validate by server 921; if no, validate by panel 923; determining if protocol version user ID and door ID are OK 960; if yes, determining is credential stale 970; determining if protocol version user ID and door ID are OK 960; if yes, determining is credential stale 970; if no, generating temporal credential from date time 980; determining do credentials match 990; if yes, unlocking door actuator and recording request granted 992; and else, recording request denial 998.

Figure 10:
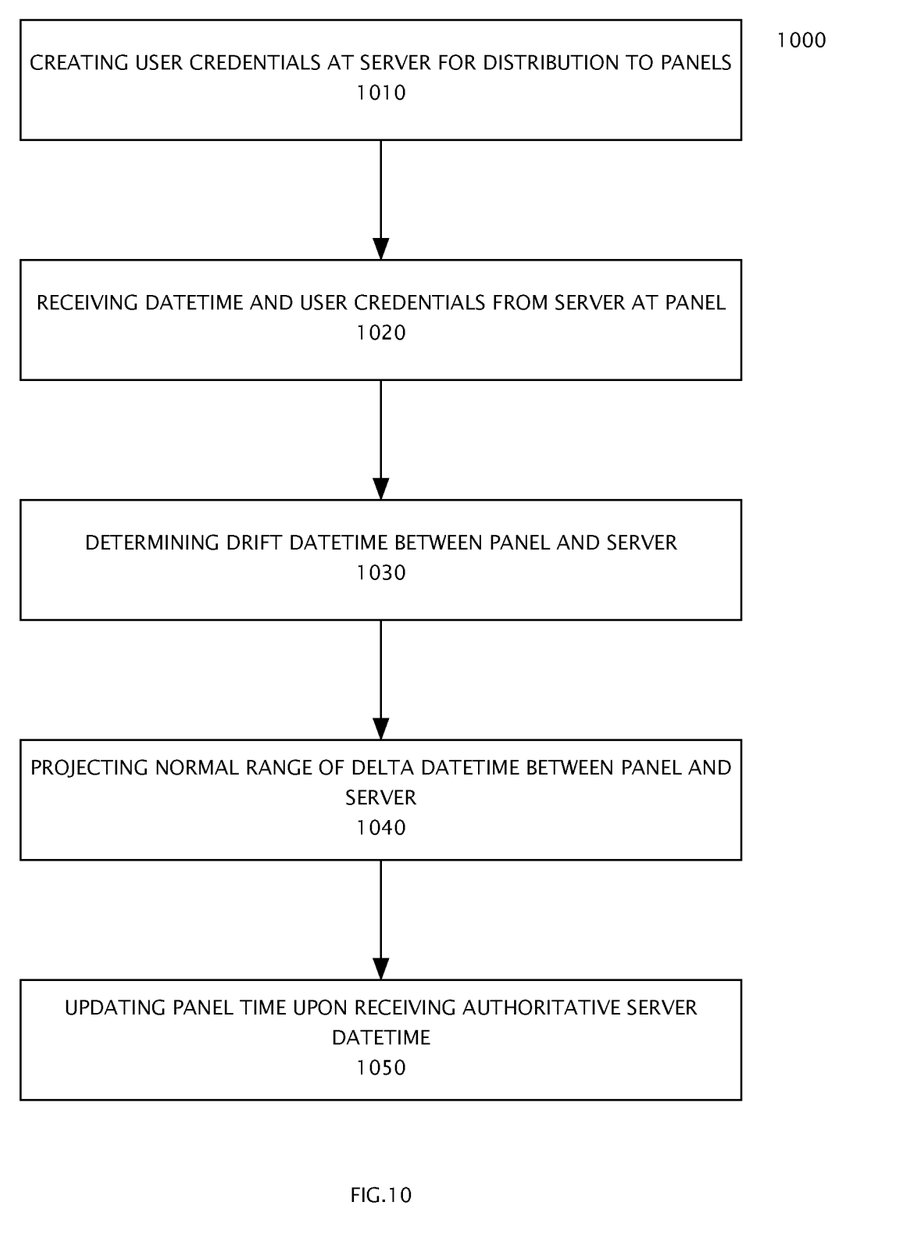
FIG. 10 is a flowchart of an exemplary non-limiting method embodiment of the overall operation of system components to provide key infrastructure for the invention.

FIG. 10 is a flowchart of an exemplary non-limiting method embodiment 1000 of the overall operation of system components to provide key infrastructure for the invention: creating user credentials and server for distribution two panels 1010; receiving daytime and user credentials from server at panel 1020; determining drift datetime between panel and server 1030; projecting normal range of a delta datetime between panel and server 1040; and updating panel time upon receiving authoritative server datetime 1050.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

One aspect of the invention is a method comprising: retrieving from non-transitory storage user_id, and user_credential; determining bleInterval value from System DateTime; vhashing door_id, user_credential, and bleInterval value; constructing access request packet from result of vhashing and door_id and user_id; and transmitting access request packet.

In an embodiment the method further includes: triggering a nonce circuit upon successful access request; and retrieving from non-transitory store a door_id associated with the reader_id.

Another aspect of the invention is a method of operation of a portal/panel controller including: transmitting beacon packet containing reader_id; receiving an access request packet from a mobile pass device; parsing access request for user_id, and door_ID; retrieving user_credential for user_id and door_ID; determining a plurality of bleInterval values from system DateTime; determining a plurality of acceptable vhash results using each bleInterval value and user_credential; and actuating portal, and recording success, when any access request contains one of the plurality of acceptable vhash results, and recording failure of access request when said access request does not.

Another aspect of the invention is a method of operation of a wireless physical access control system including the steps: within a portal/panel, transmitting beacon packet containing a reader identifier; at a mobile pass device, triggering application upon receiving said beacon packet; at said mobile pass device, retrieving from storage user_id, door_id, and user_credential; at said mobile pass device, determining bleInterval value from system DateTime; at said mobile pass device, vhashing door_id, user_credential, and bleInterval value; at said mobile pass device, constructing access request from result of vhashing and door_id and user_id; at said mobile pass device, transmitting access request; within said portal/panel, receiving an access request from said mobile pass device; within said portal/panel, parsing access request for user_id, and door_ID; within said portal/panel, retrieving user_credential for user_id and door_ID; within said portal/panel, determining a plurality of bleInterval values from system DateTime; within said portal/panel, determining a plurality of acceptable vhash results using each bleInterval value and user_credential and nonce; within said portal/panel, actuating portal, recording success, and triggering nonce circuit when any access request contains one of the plurality of acceptable vhash results, or recording failure of access request.

Another aspect of the inventions is a system including: a plurality of mobile application devices (app devices); a physical access controller (access controller) communicatively coupled to said devices; and a cloud security service server; wherein said access controller comprises: a non-transitory store of sequential access codes associated with each user id and credentials verified by the cloud security service server; a transceiver to receive and acknowledge physical access requests; a circuit to operate a portal actuator; and a non-transitory store of security policies.

In an embodiment, the system also has: a circuit to verify a physical access request with a stored forward verification code.

In an embodiment, the system also has: a circuit to perform a security policy on the condition the verification of a physical access request fails.

In an embodiment, the system also has: a circuit to cause app devices and access controllers to advance a system authentication value.

In an embodiment, the system also has: a circuit to extract and store a forward verification code from a last successful physical access request.

In an embodiment, the system also has: a circuit to determine a forward verification code for a user upon last successful physical access request.

Another aspect of the invention is a method for control of a physical access portal having the processes: at a controller, receiving a plurality of physical access requests (access requests) from a plurality of mobile application devices; at the controller, determining for each mobile application device (app device) a sequence of access requests comprising at least a first access request and a second access request; at the controller, upon authenticating the first access request (predecessor), writing into non-transitory storage a one-time verification code specific to an immediately subsequent second access request (successor) from the same app device; and at the controller, upon receiving a successor, performing an authentication process by matching the stored one-time verification code associated with the predecessor.

In an embodiment, the method also has: on the condition the authentication process passes, writing a newer one-time verification code into non-transitory storage specific to yet another immediately subsequent successor.

In an embodiment, the method also has: on the condition the authentication process fails, setting a flag of questionable chain of control associated with the app device.

In an embodiment, each newer one-time verification code is synthesized by the app device and transmitted in both a predecessor and successor request.

In an embodiment, each newer one-time verification code is a transformation of a timestamp read from the system clock of the app device.

In an embodiment, each newer one-time verification code is synthesized as transformation of the predecessor and transmitted only in the successor.

In an embodiment, each newer one-time verification code is a transformation of the result of authentication of the predecessor request.

In an embodiment, a flag of questionable chain of control causes an access control policy to be performed at the portal actuator wherein, an access control policy includes at least one of an access denial to a request from a user, or a device; an iteration of system authentication value; a version update;

reauthentication process at a mobile application device; and transmitting a notification to an access control system administrator.

In an embodiment, the app device transmits a first forward verification code from the app device that is determined by a first approximate elapsed time from a first access request to a second access request measured at the app device and the portal controller compares the first forward verification code with a second forward verification code read from non-transitory storage that was previously received as a component of the most recently successful access request.

In an embodiment, the app device transmits a first forward verification code from the app device that is determined by a first approximate elapsed time from a first access request to a second access request measured at the app device and the portal controller compares the first forward verification code with a second forward verification code that is determined by a second approximate elapsed time from the first access request to the second access request measured at the portal controller.

CONCLUSION

The object of the invention is to increase the security and efficiency of physical access control systems by decentralizing entry code generation to distributed mobile application devices.

The present invention can be easily distinguished by the dynamic generation of a verification code for a successor access request based on the elapsed time since the predecessor access request. This elapsed time is unknowable until the initiation of the successor access request. Thus, the verification code for the successor is not stored, cannot be stolen, and is not predictable. The present invention is easily distinguished from conventional public-private key encryption (PKI) systems by generating a plurality of acceptable temporal credentials. The present invention can be easily distinguished from centralized generation of key pairs which require the secure distribution of at least one key. The present invention can be easily distinguished from one-time pads which require the secure transmittal of a one-time pad to a remote user. The present invention is easily distinguished from conventional wireless apparatus physical access control systems by forward verification of one-time-use codes submitted by a mobile application device. The claimed invention forward verifies a single physical access control code upon each successful physical access request. The apparatus sets a flag that triggers an action when a one-time-use code is received out of sequence. The controller receives a plurality of physical access requests from a plurality of mobile application devices. The controller determines for each mobile application device a sequence of access requests comprising at least a first access request and a second access request. Upon authenticating the first access request, the controller writes into storage a forward verification code specific to an immediately subsequent second access request from the same app device. Upon receiving a successor, the controller performs an authentication process by matching the stored forward verification code associated with the predecessor.

Unlike conventional systems, the authentication flows in only one direction. Unlike conventional systems, the invention does not depend on secret information passed back from each portal to the mobile app device. Unlike conventional rolling codes, the forward verification determines a new code based on a successful access request. Unlike conventional systems, a range of time is supported for verification.

AN EXEMPLARY SUITABLE OPERATING ENVIRONMENT: COMPUTING DEVICE

In order to provide additional context for various aspects of the subject invention, FIG. 1 and the following discussion are intended to provide a brief, general description of a suitable operating environment 110 in which various aspects of the subject invention may be implemented. While the invention is described in the general context of computer-executable instructions, such as program modules, executed by one or more computers, processors, or other devices, those skilled in the art will recognize that the invention can also be implemented in combination with other circuits, program modules, and/or as a combination of hardware and software.

Generally, however, program modules include routines, programs, objects, components, data structures, etc. that perform particular tasks or implement particular data types. The operating environment 110 is only one example of a suitable operating environment and is not intended to suggest any limitation as to the scope of use or functionality of the invention. Other well known computer systems, environments, and/or configurations that may be suitable for use with the invention include but are not limited to, mobile phones, tablets, cloud servers, gaming devices, displays, identity credentials and their readers, cameras, attire, vehicles, medical devices, watches, robots, security instruments, weapons systems, entertainment devices, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 1, an exemplary environment 110 for implementing various aspects of the invention includes a computer 112. The computer 112 includes a processing unit 114, a system memory 116, and a system bus 118. The system bus 118 couples system components including, but not limited to, the system memory 116 to the processing unit 114. The processing unit 114 can be any of various available processors. Dual microprocessors and multi-core architectures also can be employed as the processing unit 114. Within this application the term "processor" also refers to implementations of 112 in highly integrated embodiments.

The system bus 118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 116 includes volatile memory 120 and nonvolatile memory 122. The basic input/output system (BIOS), containing the basic routines to transfer information between elements within the computer 112, such as during start-up, is stored in nonvolatile memory 122. By way of illustration, and not limitation, nonvolatile memory 122 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 112 also includes removable/non-removable, volatile/nonvolatile computer storage media. FIG. 1 illustrates, for example a disk storage 124. Disk storage 124 includes, but is not limited to, devices like a magnetic disk drive, floppy disk drive, solid state drive, flash memory card, or memory stick. In addition, disk storage 124 can include storage media separately or in combination with other storage media including, but not limited to, network storage, array of disks, or quantum storage. To facilitate connection of the disk storage devices 124 to the system bus 118, a removable or non-removable interface is typically used such as interface 126.

It is to be appreciated that FIG. 1 describes software that acts as an intermediary between users and the basic computer resources described in suitable operating environment 110. Such software includes an operating system 128. Operating system 128, which can be stored on non-transitory media such as disk storage 124, acts to control and allocate resources of the computer system 112. System applications 130 take advantage of the management of resources by operating system 128 through program modules 132 and program data 134 stored either in system memory 116 or on disk storage 124. It is to be appreciated that the subject invention can be implemented with various operating systems or combinations of operating systems, virtual machines, and virtual machine images.

A user enters commands or information into the computer 112 through input device(s) 136. Input devices 136 include, but are not limited to, a radio, magnetic, or optical scanner, a pointing device such as, mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, HDMI, a serial port, a parallel port, a game port, and a universal serial bus (USB). Output device(s) 140 use some of the same type of ports as input device(s) 136. Thus, for example, a USB port may be used to provide input to computer 112, and to output information from computer 112 to an output device 140. Output adapter 142 is provided to illustrate that there are some output devices 140 like High Definition Televisions (HDTV), monitors, speakers, and printers among other output devices 140 that require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computer 112 can operate in a networked environment using logical connections to one or more remote computers, such as remote computer(s) 144. The remote computer(s) 144 can be a cloud service, personal computer, a server, a router, a network PC, a workstation, a microprocessor based appliance, a peer device or other common network node and the like, and typically includes many or all of the elements described relative to computer 112. For purposes of brevity, only a memory storage device 146 is illustrated with remote computer(s) 144. Remote computer(s) 144 is logically connected to computer 112 through a network interface 148 and then physically connected via communication connection 150. Network interface 148 encompasses communication networks such as cellular data, Wi-Fi, Bluetooth, Near Field Communications, local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, mesh, IP, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computer 112, it can also be external to computer 112. The hardware/software necessary for connection to the network interface 148 includes, for exemplary purposes only, internal and external technologies such as, modems including satellite, 802.11, CDMA, regular telephone grade modems, cable modems and DSL modems, ISDN adapters, and Ethernet cards.

SPIRIT AND SCOPE OF THE APPENDED CLAIMS

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for control of a physical access portal comprising the processes: at a controller,
 receiving a plurality of physical access requests (access requests) from a plurality of mobile application devices; at the controller,
 determining for each mobile application device (app device) a sequence of access requests comprising at least a first access request and a second access request SOLELY GENERATED BY EACH mobile application DEVICE; at the controller, upon authenticating the first access request (predecessor), writing into non-transitory storage a one-time verification code specific to an immediately subsequent second access request (successor) from the same mobile application device; and at the controller,
 upon receiving a successor, performing an authentication process by matching the stored one-time verification code associated with the predecessor; and
 on the condition the authentication process passes, writing a newer one-time verification code into non-transitory storage specific to yet another immediately subsequent successor;

wherein each newer one-time verification code is synthesized WITH A MASK OF LEAST SIGNIFICANT BITS TO PROVIDE A RANGE OF TIME RELATING A REQUEST AND THE LAST SUCCESSFUL PHYSICAL ACCESS REQUEST SOLELY AT AND by the mobile application device and transmitted in both a predecessor and successor request; and, on the condition the authentication process fails,
    setting a flag of questionable chain of control associated with the mobile application device.

2. A method for control of a physical access portal comprising the processes: at a controller,
    receiving a plurality of physical access requests (access requests) from a plurality of mobile application devices; at the controller,
    determining for each mobile application device (app device) a sequence of access requests comprising at least a first access request and a second access request SOLELY GENERATED BY EACH mobile application DEVICE; at the controller, upon authenticating the first access request (predecessor),
    writing into non-transitory storage a one-time verification code specific to an immediately subsequent second access request (successor) from the same mobile application device; and at the controller, upon receiving a successor,
    performing an authentication process by matching the stored one-time verification code associated with the predecessor; and on the condition the authentication process passes,
    writing a newer one-time verification code into non-transitory storage specific to yet another immediately subsequent successor;

wherein each newer one-time verification code is a transformation SOLELY AT AND BY THE mobile application DEVICE of a timestamp read from the system clock of the mobile application device WITH A MASK OF LEAST SIGNIFICANT BITS TO PROVIDE A RANGE OF TIME; and, on the condition the authentication process fails,
    setting a flag of questionable chain of control associated with the mobile application device.

\* \* \* \* \*